United States Patent
Yamada et al.

(10) Patent No.: US 12,246,514 B2
(45) Date of Patent: Mar. 11, 2025

(54) LAMINATE, LAMINATE WITH ELECTRONIC DEVICE MEMBER, AND METHOD FOR PRODUCING ELECTRONIC DEVICE

(71) Applicant: AGC Inc., Tokyo (JP)

(72) Inventors: Kazuo Yamada, Tokyo (JP); Shuma Kawasaki, Tokyo (JP)

(73) Assignee: AGC INC., Tokyo (JP)

( * ) Notice: Subject to any disclaimer, the term of this patent is extended or adjusted under 35 U.S.C. 154(b) by 246 days.

(21) Appl. No.: 17/983,638

(22) Filed: Nov. 9, 2022

(65) Prior Publication Data
US 2023/0150246 A1 May 18, 2023

(30) Foreign Application Priority Data
Nov. 12, 2021 (JP) .................. 2021-184758

(51) Int. Cl.
| | |
|---|---|
| B32B 15/04 | (2006.01) |
| B32B 17/06 | (2006.01) |
| B32B 17/10 | (2006.01) |
| B32B 27/08 | (2006.01) |
| B32B 27/28 | (2006.01) |
| B32B 37/02 | (2006.01) |
| C08G 73/10 | (2006.01) |

(52) U.S. Cl.
CPC .............. *B32B 17/10* (2013.01); *B32B 27/08* (2013.01); *B32B 27/281* (2013.01); *B32B 27/283* (2013.01); *B32B 37/02* (2013.01); *C08G 73/1057* (2013.01); *B32B 2250/04* (2013.01); *B32B 2307/7242* (2013.01); *B32B 2307/732* (2013.01); *B32B 2307/748* (2013.01); *B32B 2315/08* (2013.01); *B32B 2379/08* (2013.01); *B32B 2383/00* (2013.01); *B32B 2457/12* (2013.01); *B32B 2457/202* (2013.01); *B32B 2457/206* (2013.01)

(58) Field of Classification Search
CPC .................................................. B32B 27/283
USPC .......................................................... 428/428
See application file for complete search history.

(56) References Cited

U.S. PATENT DOCUMENTS

2021/0204404 A1\* 7/2021 Hirano ............... C08G 18/7621

FOREIGN PATENT DOCUMENTS

JP 2018-193544 A 12/2018

\* cited by examiner

*Primary Examiner* — Lauren R Colgan
(74) *Attorney, Agent, or Firm* — Foley & Lardner LLP

(57) ABSTRACT

A laminate includes a glass base, a silicone resin layer, and a polyimide resin layer. The polyimide resin layer includes a fluorine-atom-containing polyimide. When examined by infrared absorption, the polyimide resin layer gives a spectrum in which a ratio of an area of a peak appearing at 3,150 $cm^{-1}$ to 3,750 $cm^{-1}$ to an area of a peak appearing at 1,650 $cm^{-1}$ to 1,750 $cm^{-1}$ is 0.9 or less.

5 Claims, 2 Drawing Sheets

LAMINATE, LAMINATE WITH ELECTRONIC DEVICE MEMBER, AND METHOD FOR PRODUCING ELECTRONIC DEVICE

CROSS-REFERENCE TO RELATED APPLICATIONS

This application claims priority from Japanese Patent Application No. 2021-184758 filed on Nov. 12, 2021, the entire subject matter of which is incorporated herein by reference.

TECHNICAL FIELD

The present invention relates to a laminate, a laminate with an electronic-device member, and a method for producing an electronic device.

BACKGROUND ART

There is a trend toward thickness and weight reductions in electronic devices such as photovoltaic (PV) cells, liquid-crystal panels (LCDs), organic EL panels (OLEDs), and receiving sensor panels which sense electromagnetic waves, X rays, ultraviolet light, visible light, infrared light, etc. Along with this trend, the thicknesses of substrates, e.g., polyimide resin substrates, for use in such electronic devices are being reduced. If a substrate has insufficient strength due to the thickness reduction, the substrate may have reduced handleability to cause a problem, for example, in the step of forming an electronic-device member on the substrate (member formation step).

Recently, a technique has been proposed in which a laminate including a supporting base and a polyimide resin substrate disposed thereon is used in order to impart satisfactory handleability to the substrate (Patent Document 1). More specifically, Patent Document 1 discloses a feature wherein a polyimide varnish is applied to a cured layer of a heat-curable resin composition to form a cured resin-varnish film (corresponding to polyimide film) and wherein precision elements can be disposed on the cured resin-varnish film.

Patent Document 1 discloses a technique in which a polyimide varnish is used to form a polyimide film and a precision element is disposed on the polyimide film.

CITATION LIST

Patent Literature

[Patent Document 1] JP-A-2018-193544

SUMMARY OF INVENTION

Technical Problem

The present inventors disposed a polyimide resin layer including a fluorine-atom-containing polyimide on a silicone resin layer, while taking account of the releasability of the polyimide film, and evaluated properties of the polyimide resin layer. As a result, the inventors discovered that the polyimide film, which had been transparent, sometimes yellowed upon high-temperature heating.

An object of the present invention is to provide a laminate including a polyimide resin layer which can be inhibited from yellowing upon high-temperature heating.

Another object of the present invention is to provide a laminate with an electronic-device member and a method for producing an electronic device.

Solution to Problem

The present inventors diligently made investigations and, as a result, have discovered that the objects can be accomplished with the following configurations.

One aspect of the present invention is a laminate including a glass base, a silicone resin layer, and a polyimide resin layer, wherein the polyimide resin layer includes a fluorine-atom-containing polyimide and, when examined by infrared absorption, the polyimide resin layer gives a spectrum in which a ratio of an area of a peak appearing at 3,150 $cm^{-1}$ to 3,750 $cm^{-1}$ to an area of a peak appearing at 1,650 $cm^{-1}$ to 1,750 $cm^{-1}$ is 0.9 or less.

The ratio of the peak area is preferably 0.6 or less, more preferably 0.5 or less.

A ratio represented by [average film thickness of the polyimide resin layer]/[average film thickness of the silicone resin layer] is preferably from 0.02 to 20.

Another aspect of the present invention is a laminate with an electronic-device member, which includes the laminate and an electronic-device member disposed on the polyimide resin layer of the laminate.

Still another aspect of the present invention is a method for producing an electronic device, which includes forming an electronic-device member on the polyimide resin layer of the laminate to obtain a laminate with the electronic-device member and separating an electronic device including the polyimide resin layer and the electronic-device member from the laminate with the electronic-device member to obtain the electronic device.

Advantageous Effect of Invention

The present invention can provide a laminate, a laminate with an electronic-device member, and a method for producing an electronic device, which are capable of inhibiting the polyimide resin layer from yellowing upon high-temperature heating.

DESCRIPTION OF EMBODIMENTS

Embodiments of the present invention are described below using the drawings for reference. However, the following embodiments are mere examples for illustrating the present invention, and the invention is not limited to the following embodiments. Various modifications and replacement can be given to the following embodiments within the scope of the present invention.

Terms in the present invention have the following meanings.

An average value of surface roughness Ra is determined by measuring the surface roughness Ra of each of arbitrarily selected ten portions of a surface to be examined (measurement area: 940 μm (length)×700 μm (width)) and calculating an arithmetic average of the ten measured values.

The surface roughness Ra is measured using, for example, non-contact surface/layer section shape determination system "Vertscan R3300-light", manufactured by Mitsubishi Chemical Systems, Inc.

Film-thickness unevenness is determined by measuring the thickness of each of arbitrarily selected ten portions of an object to be examined and taking the difference between maximum and minimum values among the ten measured values as the film-thickness unevenness.

Average film thickness is an arithmetic average of ten values measured in the manner shown above.

In the case of the film thickness of a silicone resin layer, however, the measurement areas are not selected from a peripheral region ranging from each peripheral end of the silicone resin layer to a distance of 3 mm therefrom toward the center.

Film thickness is measured, for example, with a contact type film thickness measuring device.

Each numerical range expressed using "-" includes the numerical values given before and after the "-" as a lower limit value and an upper limit value.

The laminate of the present invention, which includes a glass base, a silicone resin layer, and a polyimide resin layer, is characterized in that the polyimide resin layer includes a fluorine-atom-containing polyimide and, when examined by infrared absorption, gives a spectrum in which a ratio of an area of a peak appearing at 3,150-3,750 $cm^{-1}$ to an area of a peak appearing at 1,650-1,750 $cm^{-1}$ is 0.9 or less. It has been found that due to the feature, the polyimide resin layer can be inhibited from yellowing upon high-temperature heating. Thus, the desired effect is obtained.

In the laminate, $H_2O$ released from the glass base during high-temperature heating is trapped and absorbed by the silicone resin layer and is thereby prevented from infiltrating into the polyimide resin layer. Thus, the polyimide resin layer is inhibited from yellowing. In cases when a polyimide resin layer satisfies the property specified through the infrared absorption examination, this means that the polyimide resin layer contains $H_2O$ in a small amount; this property also relates to inhibition of the yellowing of the polyimide resin layer.

<Laminate>

Figure 1:
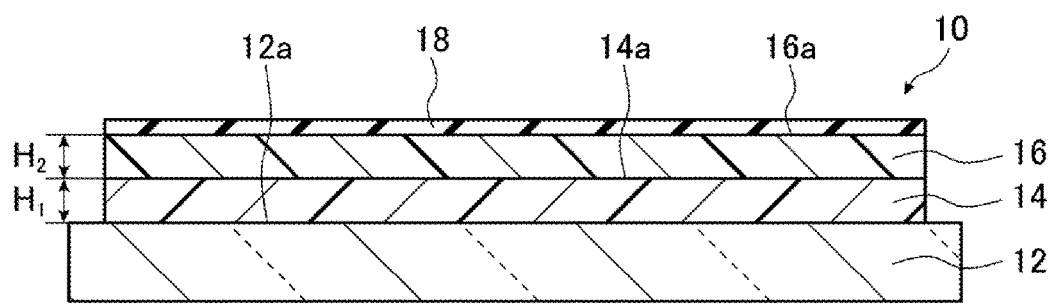
FIG. 1 is a cross-sectional view schematically illustrating one embodiment of the laminate of the present invention.

FIG. 1 is a cross-sectional view schematically illustrating one embodiment of the laminate of the present invention.

The laminate 10 illustrated in FIG. 1 includes a glass base 12, a silicone resin layer 14, and a polyimide resin layer 16 in this order. As FIG. 1 shows, the silicone resin layer 14 has been disposed on a surface 12a of the glass base 12, and the polyimide resin layer 16 has been disposed on a surface 14a of the silicone resin layer 14. A gas barrier layer 18 has been disposed on a surface 16a of the polyimide resin layer 16. The gas barrier layer 18 is a layer for protecting, against moisture, an electronic device to be formed on the gas barrier layer 18.

For example, the glass base 12, the silicone resin layer 14, the polyimide resin layer 16, and the gas barrier layer 18 are each quadrilateral in a plan view. The glass base 12, the silicone resin layer 14, the polyimide resin layer 16, and the gas barrier layer 18 have been disposed so that the corresponding edges thereof are parallel with each other.

The gas barrier layer 18 is not always necessary, and the laminate 10 may have a configuration not including the gas barrier layer 18.

The configuration of the laminate 10 is not limited to FIG. 1. For example, the laminate 10 may have a configuration including a gas barrier layer (not shown) disposed between the glass base 12 and the silicone resin layer 14, or may have a configuration including a polyimide resin layer (not shown) and a gas barrier layer (not shown) which have been disposed over the gas barrier layer 18.

(Applications of the Laminate)

The laminate 10 can be used in various applications. Examples thereof include applications in which electronic components for display-device panels which are described below, PV cells, thin-film secondary batteries, semiconductor wafers having a circuit formed on the surface, receiving sensor panels, etc. are produced. In these applications, there are cases where the laminate is exposed to the condition of high temperatures (e.g., 450° C. or higher) in the air atmosphere, a nitrogen atmosphere, or a vacuum (for example, for 20 minutes or longer).

The display-device panels include LCDs, OLEDs, electronic paper, plasma display panels, field emission panels, quantum-dot LED panels, micro-LED display panels, MEMS shutter panels, and the like.

The receiving sensor panels include magnetic-wave receiving sensor panels, X-ray receiving sensor panels, ultraviolet-light receiving sensor panels, visible-light receiving sensor panels, infrared-light receiving sensor panels, and the like. Substrates for use in such receiving sensor panels may have been reinforced with, for example, a reinforcing sheet of, for example, a resin.

The glass base 12, silicone resin layer 14, polyimide resin layer 16, and gas barrier layer 18 which constitute the laminate 10 are described in detail below.

(Glass Base)

The glass base 12 is a member which supports and reinforces the silicone resin layer 14. The glass base 12 also functions as a conveyance substrate.

Preferred kinds of glass are alkali-free borosilicate glass, borosilicate glass, soda-lime glass, high-silica glass, and other oxide-based glasses including silicon oxide as a main component. The oxide-based glasses are preferably glasses having a silicon oxide content of 40-90 mass % in terms of oxide amount.

More specifically, examples of glass plates include glass plates made of alkali-free borosilicate glass (trade names "AN100" and "AN Wizus", manufactured by AGC Inc.).

The glass plate is produced usually by melting raw materials for glass and forming the molten glass into a plate shape. This forming may be conducted by a common method, and examples thereof include a float process, a fusion process, and a slot downdraw process.

The glass base 12 preferably is not flexible. The glass base 12 hence has a thickness of preferably 0.3 mm or larger, more preferably 0.5 mm or larger.

Meanwhile, the thickness of the glass base 12 is preferably 1.0 mm or less.

The glass base 12 has a surface roughness Ra of preferably less than 0.4 nm, more preferably less than 0.25 nm. In case where the surface roughness of the glass base 12 is too high, there is an increased contact area between the silicone resin layer and the glass base surface and water molecules are prone to migrate from the glass base to the silicone resin layer, making the polyimide resin layer prone to yellow. It is hence preferable that the surface roughness of the glass base 12 is less than the given value.

The glass base 12 is not limited in its shape viewed from a direction normal to the surface 12*a* of the glass base 12. Although the shape thereof may be quadrilateral or circular, a quadrilateral shape is preferred.

The glass base 12 is larger than both the silicone resin layer 14 and the polyimide resin layer 16, and the surface 12*a* of the glass base 12 includes a peripheral region where none of the silicone resin layer 14, polyimide resin layer 16, and gas barrier layer 18 has been disposed. In the peripheral region, the surface 12*a* of the glass base 12 is exposed.

The width of the peripheral region is not particularly limited, but is preferably 1-30 mm, more preferably 3-10 mm. The width of the peripheral region corresponds to the distance between the periphery of the glass base 12 and the periphery of the polyimide resin layer 16.

In cases when the width of the peripheral region is 30 mm or less, a larger effective area is obtained in forming electronic devices, etc., resulting in an improvement in the efficiency of electronic-device production. Meanwhile, in cases when the width of the peripheral region is 1 mm or larger, it is possible, in the step of producing an electronic device on the gas barrier layer 18, to reduce the formation of particles (foreign particles) due to contacts between a conveyance member or a support member for, for example, a treatment device and an end of the laminate.

(Silicone Resin Layer)

The silicone resin layer 14 is a film for preventing the polyimide resin layer 16, which has been disposed thereon, from peeling off.

The silicone resin layer 14 has been disposed on the glass base 12.

A silicone resin is a resin including given organosiloxane units and is usually obtained by curing a curable silicone. Curable silicones are classified by curing mechanism into addition reaction type silicones, condensation reaction type silicones, ultraviolet curing type silicones, and electron-beam curing type silicones, and any of these can be used. Preferred of these are condensation reaction type silicones.

A condensation reaction type silicone suitable for use is: a monomeric hydrolyzable organosilane compound or a mixture of these compounds (monomer mixture); or a product of partial hydrolysis and condensation (organopolysiloxane) obtained by subjecting the monomer or the monomer mixture to a partial hydrolysis/condensation reaction.

By using the condensation reaction type silicone and causing the silicone to undergo a hydrolysis/condensation reaction (sol-gel reaction), a silicone resin can be formed.

The silicone resin layer 14 is preferably formed using a curable composition including a curable silicone.

The curable composition may contain a solvent, a platinum catalyst (in the case of using an addition reaction type silicone as the curable silicone), a leveling agent, a metal compound, etc., besides the curable silicone. Examples of the metallic element contained in the metal compound include 3d transition metals, 4d transition metals. lanthanoid metals, bismuth (Bi), aluminum (Al), and tin (Sn). The content of the metal compound is not particularly limited and may be suitably regulated.

The silicone resin layer 14 preferably has hydroxyl groups. Hydroxyl groups can appear upon scission of some of the Si—O—Si bonds constituting the silicone resin of the silicone resin layer 14. In the case of using a condensation reaction type silicone, hydroxyl groups thereof can become hydroxyl groups of the silicone resin layer 14.

The silicone resin layer 14 has an average value of film thickness $H_1$ (see FIG. 1) of preferably 0.5-30 μm, more preferably 0.5-20 μm. In cases when the average film thickness of the silicone resin layer 14 is 6.0 μm or larger, this silicone resin layer 14 has excellent foreign-particle-embedding properties.

The expression "having excellent foreign-particle-embedding properties" means that even when there are foreign particles between the glass base 12 and the silicone resin layer 14, the foreign particles are embedded in the silicone resin layer 14. In cases when the silicone resin layer 14 has excellent foreign-particle-embedding properties, this silicone resin layer is less apt to have protrusions due to foreign particles and an electronic-device member formed over the polyimide resin layer 16 is inhibited from having the risk of disconnection therein due to the protrusions. Since the formation of the protrusions is accompanied with voids, which are observed as bubbles, it is possible to evaluate the foreign-particle-embedding properties on the basis of whether bubbles have been formed or not.

The surface 14*a* of the silicone resin layer 14 has an average value of surface roughness Ra of preferably 50.00 nm or less, more preferably 30.00 nm or less, still more preferably 15.00 nm or less, especially preferably 5.00 nm or less. In cases when the average value of surface roughness Ra of the surface 14*a* is within that range, the polyimide resin layer 16 produced by formation thereof on the silicone resin layer 14 of the laminate 10 and thereafter peeling it therefrom has reduced surface roughness.

The average value of surface roughness Ra of the surface 14*a* of the silicone resin layer 14 is preferably 0.10 nm or higher, more preferably 0.30 nm or higher, since this surface 14*a* can be kept in close contact with the polyimide resin layer 16 formed on the silicone resin layer 14.

(Polyimide Resin)

The polyimide resin layer includes a polyimide containing fluorine atoms.

The polyimide resin layer, when examined by infrared absorption, gives a spectrum in which a ratio of an area of a peak appearing at 3,150-3,750 $cm^{-1}$ to an area of a peak appearing at 1,650-1,750 $cm^{-1}$ is 0.9 or less and is preferably 0.6 or less, more preferably 0.5 or less. The peak area ratio is still more preferably 0.3 or less. Although there is no particular lower limit, the peak area ratio is 0 or larger in many cases, and is 0.05 or larger in more cases. Thus, the desired effect is obtained.

In the laminate, $H_2O$ released from the glass base during high-temperature heating is trapped and absorbed by the silicone resin layer and is thereby prevented from infiltrating into the polyimide resin layer. Thus, the polyimide resin layer is inhibited from yellowing. In cases when a polyimide resin layer satisfies the property specified through infrared absorption examination, this means that the polyimide resin layer contains $H_2O$ in a small amount; this property also relates to inhibition of the yellowing of the polyimide resin layer.

Figure 2:
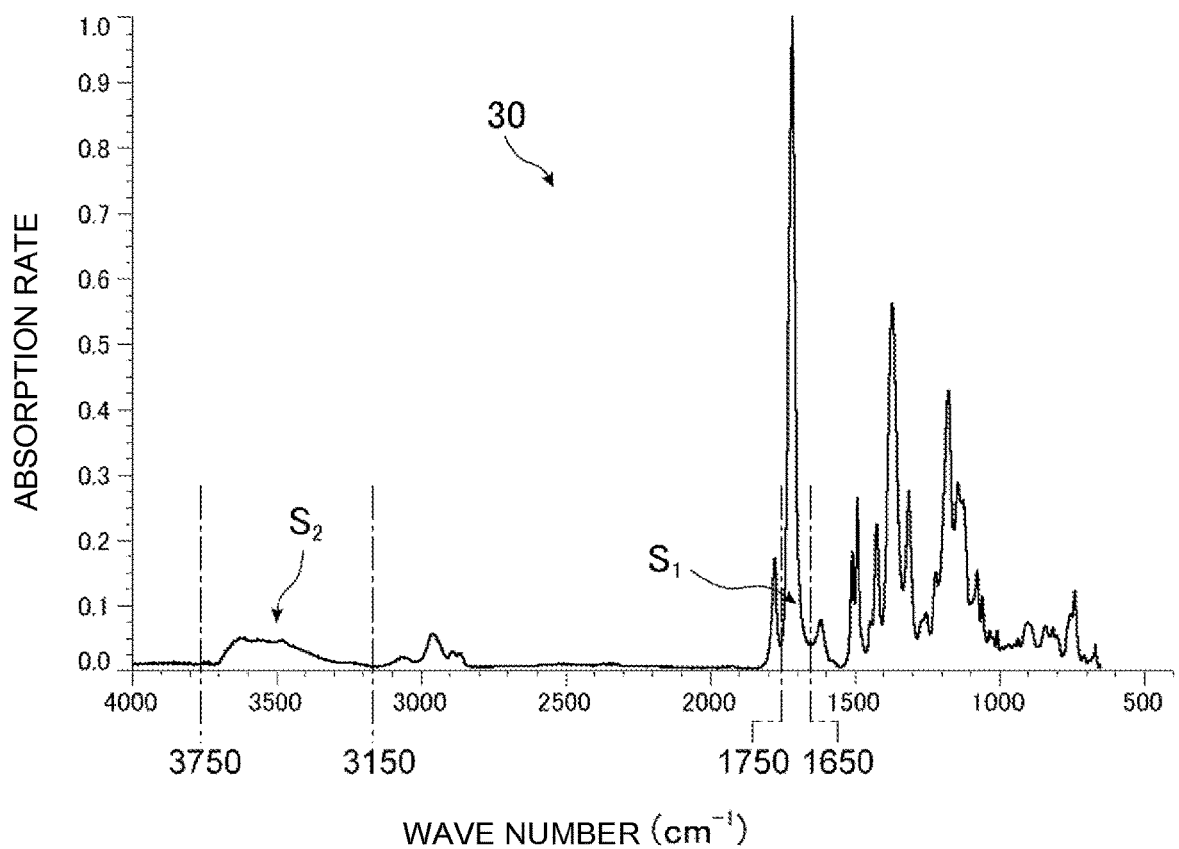
FIG. 2 is a graph showing one example of infrared absorption spectra of the polyimide resin layer of an embodiment of the laminate of the present invention.

FIG. 2 is a graph showing one example of infrared absorption spectra of the polyimide resin layer of an embodiment of the laminate of the present invention. The spectrum 30 shown in FIG. 2 is one obtained through base-line correction. In the spectrum 30 shown in FIG. 2, which has undergone base-line correction, the area of an imide-derived peak appearing at 1,650-1,750 $cm^{-1}$ is expressed by $S_1$. Meanwhile, the area of a peak appearing at 3, 150-3,750 $cm^{-1}$ is expressed by $S_2$. The ratio between the peak areas, $S_2/S_1$, is 0.9 or less.

The peak appearing at 1,650-1,750 $cm^{-1}$ is a peak derived mainly from imide groups of the polyimide, and the peak appearing at 3,150-3,750 $cm^{-1}$ is a peak derived mainly from OH groups. Because of this, the polyimide resin layer having an $S_2/S_1$ ratio of 0.9 or less has a low OH group content and emits a smaller amount of moisture upon heating, and can be more effectively inhibited from yellowing.

The spectrum 30 can be analyzed using, for example, analysis software OMNIC Ver. 8.2 (manufactured by Thermo Fisher Scientific) in the following manner to obtain an area ratio.

First, a base line is drawn on an infrared transmission spectrum of the polyimide resin layer to correct the spectrum. The imide-group-derived peak is subjected to the base-line correction in which 1,550 cm$^{-1}$ and 1,850 cm$^{-1}$ are used as reference wavenumbers, and the hydroxyl-group-derived peak is subjected to the base-line correction in which 3,150 cm$^{-1}$ and 3,750 cm$^{-1}$ are used as reference wavenumbers. Subsequently, using "Peak Area Tool" of the analysis software, the area of each peak is determined. With respect to the imide-derived peak, the area of the portion ranging from 1,650 cm$^{-1}$ to 1,750 cm$^{-1}$ is determined. With respect to the hydroxyl-group-derived peak, the area of the portion ranging from 3,150 cm$^{-1}$ to 3,750 cm$^{-1}$ is determined. From the obtained areas, the peak-area ratio $S_2/S_1$ is obtained.

The polyimide resin layer is examined for infrared absorption spectrum in the following manner. The polyimide resin layer is peeled from the laminate, and the peeled polyimide resin layer is allowed to stand still overnight in an environment having a temperature of 23° C. and a relative humidity of 45% and then examined with Nicolet 6700 FT-IR, manufactured by Thermo Fisher Scientific.

The polyimide resin layer 16 has an average value of film thickness $H_2$ (see FIG. 1) of preferably 0.5-20 μm, more preferably 1-10 μm.

The ratio α represented by [average film thickness of the polyimide resin layer]/[average film thickness of the silicone resin layer] is preferably 0.02-20, more preferably 0.1-10, still more preferably 0.2-5.

In cases when the ratio α is 0.02-20, it is possible to lessen the trouble that the laminate has too high stress due to a difference in CTE (coefficient of thermal expansion) between the polyimide resin layer and the silicone resin layer and this results in the occurrence of cracks in the silicone resin layer, the formation of rumples in the polyimide resin layer, or interfacial separation between the polyimide resin layer and the silicone resin layer. In addition, since the thickness of the silicone resin layer is large for the thickness of the polyimide resin layer, the effect of inhibiting the polyimide resin layer from yellowing is sufficiently obtained.

The polyimide resin layer 16 has a film-thickness unevenness of preferably 0.5 μm or less, more preferably 0.2 μm or less. A lower limit of the film-thickness unevenness may be 0 μm.

The polyimide resin layer 16 may be either a single-layer film or a multilayer film composed of two or more layers.

The surface of the polyimide resin layer 16 is preferably smooth, from the standpoint of forming, for example, high-precision wiring of an electronic device. Specifically, the polyimide resin layer 16 has an average value of surface roughness Ra of preferably 50 nm or less, more preferably 30 nm or less, still more preferably 10 nm or less. A lower limit of the Ra may be 0 nm.

The polyimide resin layer 16 preferably has such a coefficient of thermal expansion that the difference in coefficient of thermal expansion between the polyimide resin layer 16 and the glass base 12 is small, because this is effective in inhibiting the laminate 10 from warping after heating or after cooling. Specifically, the difference in coefficient of thermal expansion between the polyimide resin layer 16 and the glass base 12 is preferably 0×10$^{-6}$/° C. to 90×10$^{-6}$/° C., more preferably 0×10$^{-6}$/° C. to 30×10$^{-6}$/° C.

The polyimide resin layer 16 is not particularly limited in its area. However, from the standpoint of efficiency of producing electronic devices, the area of the polyimide resin layer 16 is preferably 300 cm$^2$ or larger.

The polyimide resin layer 16 preferably has a low yellowness index (YI). The YI of the polyimide resin layer 16 is preferably 10.0 or less, more preferably 5.0 or less, still more preferably 3.5 or less, especially preferably 1.5 or less. A lower limit of the YI may be 0.

YI (yellowness index) is determined in accordance with JIS K7361-1.

The yellowness index of the polyimide resin layer formed on the silicone resin layer which is determined after the laminate is heated at 430° C. for 1 hour in a nitrogen atmosphere is referred to as first yellowness index. The first yellowness index is a value determined by examining the polyimide resin layer which has been peeled from the laminate, i.e., a value determined by examining the polyimide resin layer without the silicone resin layer.

A reference laminate (not shown) composed of a glass base and a polyimide resin layer directly formed thereon is prepared and heated at a temperature of 430° C. for 1 hour in a nitrogen atmosphere, and the yellowness index of the polyimide resin layer of the reference laminate which is determined after the heating is referred to as second yellowness index. The second yellowness index is a value determined by examining the polyimide resin layer which has been peeled from the reference laminate, i.e., a value determined by examining the polyimide resin layer alone without the glass base.

A value obtained by subtracting the first yellowness index from the second yellowness index is preferably 10 or larger, more preferably 20 or larger.

The value obtained by subtracting the first yellowness index from the second yellowness index is referred to as YI difference. YI difference is an index to yellowing-inhibitive effect. YI differences of 10 and larger are preferred because the polyimide resin layer can be inhibited from yellowing.

The refractive index of the polyimide resin layer formed on the silicone resin layer which is determined after the laminate is heated at a temperature of 430° C. for 1 hour in a nitrogen atmosphere is referred to as first refractive index. The first refractive index is a value determined by examining the polyimide resin layer which has been peeled from the laminate, i.e., a value determined by examining the polyimide resin layer without the silicone resin layer.

A reference laminate (not shown) composed of a glass base and a polyimide resin layer directly formed thereon is prepared and heated at a temperature of 430° C. for 1 hour in a nitrogen atmosphere, and the refractive index of the polyimide resin layer of the reference laminate which is determined after the heating is referred to as second refractive index. The second refractive index is a value determined by examining the polyimide resin layer which has been peeled from the reference laminate, i.e., a value determined by examining the polyimide resin layer alone without the glass base.

A refractive-index difference obtained by subtracting the first refractive index from the second refractive index relates to inhibition of the yellowing of the polyimide resin layer, and in cases when the refractive-index difference is larger, the yellowing of the polyimide resin layer is inhibited. Because of this, the refractive-index difference obtained by subtracting the first refractive index from the second refractive index is preferably 0.005 or larger, more preferably 0.009 or larger.

The first refractive index and the second refractive index are values measured with a refractometer (prism coupler "2010/M", manufactured by Metricon Corp.).

The polyimide resin layer 16 has a light transmittance in the visible-light region of preferably 80% or higher. An upper limit of the light transmittance may be less than 100%.

The polyimide included in the polyimide resin layer 16 may be any polyimide containing fluorine atoms.

The polyimide is usually obtained by condensation-polymerizing a tetracarboxylic acid dianhydride and a diamine and imidizing the polymer. More specifically, the polyimide preferably includes repeating units represented by the following Formula (1), which each include a residue (X) of a tetracarboxylic acid compound and a residue (A) of a diamine compound. [Chem. 1]

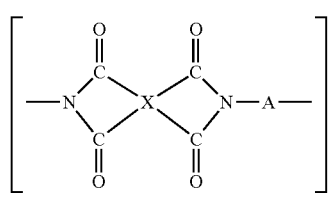

Formula (1)

In Formula (1), X represents a tetracarboxylic acid residue formed by removing the carboxy groups from a tetracarboxylic acid compound, and A represents a diamine residue formed by removing the amino groups from a diamine compound.

Examples of methods for obtaining the polyimide containing fluorine atoms include a method in which use is made of at least one compound selected from the group consisting of tetracarboxylic acid dianhydrides each containing a fluorine atom and diamines each containing a fluorine atom. For example, a polyimide containing fluorine atoms is obtained by condensation-polymerizing a tetracarboxylic acid dianhydride containing a fluorine atom with a diamine and imidizing the polymer. Alternatively, a polyimide containing fluorine atoms is obtained by condensation-polymerizing a tetracarboxylic acid dianhydride with a diamine containing a fluorine atom and imidizing the polymer.

Examples of the polyimide containing fluorine atoms include ones in which X in formula (1) is a tetracarboxylic acid residue having a fluorine atom and ones in which A in formula (1) is a diamine residue having a fluorine atom.

Examples of the tetracarboxylic acid dianhydride to be used include aromatic tetracarboxylic acid dianhydrides and aliphatic tetracarboxylic acid dianhydrides. Examples of the diamine to be used include aromatic diamines and aliphatic diamines.

Examples of the aromatic tetracarboxylic acid dianhydrides include pyromellitic anhydride (1,2,4,5-benzenetetracarboxylic acid dianhydride), 3,3',4,4'-benzophenonetetracarboxylic acid dianhydride, 3,3',4,4'-biphenyltetracarboxylic acid dianhydride, and 3,3',4,4'-(diphenyl ether)tetracarboxylic acid dianhydride. Examples of the aromatic diamines include 4,4'-oxydiaminobenzene (4,4'-diaminodiphenyl ether), 1,3-bis(3-aminophenoxy)benzene, 4,4'-bis(3-aminophenoxy) biphenyl, 1,4-diaminobenzene, and 1,3-diaminobenzene.

(Gas Barrier Layer)

The gas barrier layer 18 is made of, for example, an inorganic material such as silicon nitride (SiN), $Al_2O_3$, $SiO_2$, or SiON. The gas barrier layer 18 may be a multilayer film composed of superposed layers including a layer of an organic material, e.g., a thermoplastic resin or an organosilicon compound, and a layer of an inorganic material, e.g., silicon oxide or silicon nitride. Film deposition methods are not particularly limited, and examples thereof include known methods such as, for example, plasma-assisted CVD and sputtering.

In the case where the polyimide resin layer 16 is configured of a plurality of films, this polyimide resin layer 16 may have a gas barrier layer 18 disposed between two or more of the films.

The film thickness of the gas barrier layer 18 is preferably 10-10,000 nm, more preferably 50-1,000 nm. When the film thickness is less than 10 nm, the gas barrier property is insufficient and devices formed on the gas barrier layer may deteriorate. On the other hand, when the film thickness exceeds 10,000 nm, the gas barrier layer is less flexible and cracks may be generated in the gas barrier layer when the flexible device is deformed.

<Method for Producing the Laminate>

Methods for producing the laminate are not particularly limited, and examples thereof include known methods.

Preferred of these is a method in which a multilayer substrate including a glass base and a silicone resin layer is produced and a polyimide resin layer is formed on the silicone resin layer of the multilayer substrate, from the standpoint that this method is superior in production efficiency.

First, examples of methods for producing the multilayer substrate include a method in which: a transfer film including a temporary support and a precursor film disposed thereon, which becomes a silicone resin layer through a heat treatment, is prepared; the precursor film in the transfer film is adhered to a glass base so as to lie in a given position thereon; and the resultant laminate, which includes the glass base, the precursor film, and the temporary support, is subjected to a heat treatment. By performing the heat treatment, a silicone resin layer is formed.

After the transfer film is adhered to the glass base, the resultant laminate may be cleaned with an alkali detergent. After having been cleaned with the alkali detergent, the laminate may be rinsed with pure water according to need. Furthermore, after the rinsing with pure water, the adherent water may be removed with an air-knife according to need. After the air-knife treatment, the laminate may be dried with heating. The cleaning may be conducted with brushing. The temperature of the alkali detergent to be used in the cleaning and the temperature of the pure water to be used in the rinsing are preferably 20° C. or higher, more preferably 40° C. or higher, from the standpoint of detergency.

The heat treatment for forming a silicone resin layer is preferably performed while a pressure is being applied. Specifically, it is preferred to use an autoclave to conduct the heat treatment and a pressure treatment.

The heating temperature in the heat treatment is preferably 50-350° C., more preferably 55-300° C., still more preferably 60-250° C. The heating period is preferably 10-60 minutes, more preferably 20-40 minutes.

The pressure in the pressure treatment is preferably 0.5-1.5 MPa, more preferably 0.8-1.0 MPa.

The heat treatment may be conducted multiple times. In the case of conducting multiple heat treatments, each heat treatment may employ different heating conditions.

For example, in the case of conducting multiple heat treatments, different heating temperatures may be used. For example, in the case of conducting two heat treatments, the first heat treatment may be performed under the temperature conditions of below 200° C. and the second heat treatment may be performed under the temperature conditions of 200° C. or higher.

Furthermore, in the case of conducting multiple heat treatments, whether the pressure treatment is performed or not may be changed. For example, in the case of conducting two heat treatments, the first heat treatment may be performed together with the pressure treatment and the second heat treatment may be performed with no pressure treatment.

In producing a multilayer substrate using the transfer film, either the heat treatment may be conducted after the temporary support is removed or the heat treatment may be conducted, with the temporary support left on the silicone resin layer. In the case of conducting multiple heat treatments, the temporary support may be removed between the heat treatments. For example, the temporary support may be removed after the first heat treatment, before the second heat treatment is performed.

In preparation for removal of the temporary support, a cutout may be formed in the temporary support in order to facilitate the removal. Alternatively, some of an end portion of the temporary support may be peeled from the precursor film or silicone resin layer to form a return portion for use as a starting point for the removal. A pull tape may be attached to the temporary support. Furthermore, in order to facilitate removal of the temporary support, the temporary support may be made larger than the precursor film or silicone resin layer and protrudent therefrom so that a protrudent portion of the temporary support can be pinched in removing the temporary support.

The removal of the temporary support is preferably conducted by 180-degree peeling because the precursor film or silicone resin layer is less apt to receive flaws to have failures.

It is preferred to use an ionizer or to humidify the peeling environment, in order to prevent the adhesion of dust particles due to static buildup caused by peeling.

For the heat treatment, use can be made of a heating furnace such as a circulating furnace or an infrared furnace. It is preferred to evacuate the heating furnace in order to remove any gas generated from the silicone resin layer during the heat treatment. The inside of the heating furnace preferably has a cleanness of class 10,000 or cleaner.

A surface treatment may be given to the surface of the silicone resin layer of the multilayer substrate.

Examples of the surface treatment include corona treatment, atmospheric-pressure plasma treatment, UV ozone treatment, and excimer UV treatment. Preferred are corona treatment and atmospheric-pressure plasma treatment.

The surface 14a of the silicone resin layer 14 which has undergone the surface treatment has a contact angle with water of preferably 10 degrees or less, more preferably 5 degrees or less.

The multilayer substrate described above can be used to produce the laminate 10 shown in FIG. 1, which includes a glass base 12, a silicone resin layer 14, and a polyimide resin layer 16.

Specifically, examples of methods for producing the laminate 10 include a method in which a polyimide varnish including a polyimide and a solvent is applied to the surface of the silicone resin layer 14 of the multilayer substrate to form a polyimide resin layer 16 on the silicone resin layer 14, thereby forming a laminate including the glass base 12, the silicone resin layer 14, and the polyimide resin layer 16 in this order.

This production method is described in detail below, and thereafter the configuration of the polyimide resin layer 16 is described in detail.

(Polyimide Varnish)

The polyimide varnish includes a polyimide or a precursor thereof and a solvent.

The polyimide is usually obtained by condensation-polymerizing a tetracarboxylic acid dianhydride and a diamine and imidizing the polymer. The polyimide preferably has solubility in solvents.

Examples of the precursor include tetracarboxylic acid dianhydrides and diamines.

The polyimide varnish preferably contains a solvent.

The solvent may be any solvent in which the polyimide or precursor thereof dissolves. Examples thereof include phenolic solvents (e.g., m-cresol), amide solvents (e.g., N-methyl-2-pyrrolidone, N,N-dimethylformamide, and N,N-dimethylacetamide), lactone solvents (e.g., γ-butyrolactone, δ-valerolactone, ε-caprolactone, γ-crotonolactone, γ-hexanolactone, α-methyl-γ-butyrolactone, γ-valerolactone, α-acetyl-γ-butyrolactone, and δ-hexanolactone), sulfoxide solvents (e.g., N,N-dimethyl sulfoxide), ketone solvents (e.g., acetone, methyl ethyl ketone, methyl isobutyl ketone, and cyclohexanone), and ester solvents (e.g., methyl acetate, ethyl acetate, butyl acetate, and dimethyl carbonate).

The polyimide varnish contains a polyimide resin or precursor thereof in an amount of preferably 5-40 mass %, more preferably 10-30 mass %. The polyimide varnish has a viscosity of preferably 1-200 Pas, more preferably 5-150 Pa·s.

Methods for applying the polyimide varnish to the silicone resin layer 14 of the multilayer substrate are not particularly limited, and examples thereof include known methods such as, for example, slit coating, curtain coating, spray coating, die coating, spin coating, dip coating, roll coating, bar coating, screen printing, and gravure coating.

After the application, a heat treatment may be conducted according to need.

Conditions for the heat treatment include temperatures of preferably 50-500° C., more preferably 50-450° C. The heating period is preferably 10-300 minutes, more preferably 20-200 minutes.

The heat treatment may be conducted multiple times. In the case of conducting multiple heat treatments, each heat treatment may employ different heating conditions.

The surface of the thus-formed polyimide film may be polished in order to planarize particles and protrusions.

Before application of the polyimide varnish, the multilayer substrate may be cleaned with an alkali detergent. After having been cleaned with the alkali detergent, the multilayer substrate may be rinsed with pure water according to need. Furthermore, after the rinsing with pure water, the adherent water may be removed with an air-knife according to need. After the air-knife treatment, the multilayer substrate may be dried with heating. It is preferred to conduct the cleaning without brushing, because the surface of the silicone resin layer may receive scratches due to contacts with a brush.

The multilayer substrate to which the polyimide varnish is to be applied may be inspected for surface quality like the glass substrate.

<Laminate with Electronic-Device Member>

Figure 3:
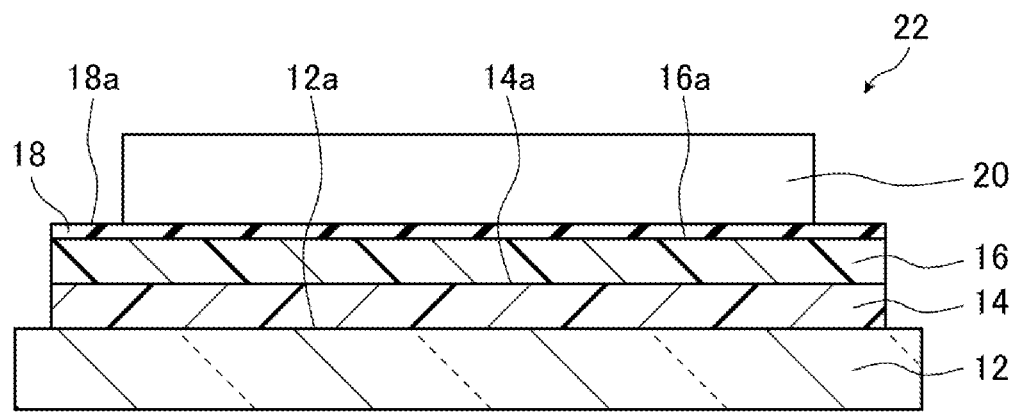
FIG. 3 is a cross-sectional view schematically illustrating a member formation step.

As FIG. 3 shows, a laminate 22 with an electronic-device member includes a laminate 10 and an electronic-device member 20 disposed over the polyimide resin layer 16 of the laminate 10. In FIG. 3, the electronic-device member 20 has been disposed on the surface 18a of a gas barrier layer 18. In the case where the laminate 22 with an electronic-device member has a configuration including no gas barrier layer 18, the electronic-device member 20 has been disposed on the polyimide resin layer 16. The electronic-device member 20 is described later.

<Method for Producing Electronic Device>

An electronic device including a polyimide resin layer and an electronic-device member, which is described later, is produced using the laminate.

A method for producing such an electronic device, for example, includes a member formation step in which, as shown in FIG. 3, an electronic-device member 20 is formed on the gas barrier layer 18 on the polyimide resin layer 16 of the laminate 10 (i.e., formed on the surface 18a of the gas barrier layer 18 which lies on the side opposite from the silicone resin layer 14) to obtain a laminate 22 with the electronic-device member and a separation step in which an electronic device 24 including the polyimide resin layer 16, the gas barrier layer 18, and the electronic-device member 20 is obtained from the laminate 22 with the electronic-device member.

Hereinafter, the step of forming the electronic-device member 20 is referred to as "member formation step", and the step of separating the laminate 22 into the electronic device 24 and the glass base 26 with the silicone resin layer is referred to as "separation step". The glass base 26 with the silicone resin layer corresponds to the multilayer substrate described above.

The materials and procedure to be used in each step are described in detail below.

(Member Formation Step)

The member formation step is a step in which an electronic-device member 20 is formed on the gas barrier layer 18 on the polyimide resin layer 16 of the laminate 10. More specifically, as shown in FIG. 3, an electronic-device member 20 is formed on the gas barrier layer 18 on the polyimide resin layer 16 (i.e., formed on the surface 18a of the gas barrier layer 18 which lies on the side opposite from the silicone resin layer 14) to obtain a laminate 22 with the electronic-device member.

First, the electronic-device member 20 to be formed in this step is described in detail before the procedure of the step is described in detail.

(Electronic-Device Member)

The electronic-device member 20 is a member which constitutes at least some of an electronic device to be formed on the surface 18a of the gas barrier layer 18 on the polyimide resin layer 16 of the laminate 10. More specifically, examples of the electronic-device member 20 include members to be used in panels for display devices, photovoltaic cells, thin-film secondary batteries, electronic components, e.g., semiconductor wafers, having a circuit formed on the surface, receiving sensor panels, and the like (for example, members for display devices, e.g., LTPS (low temperature polysilicon), members for photovoltaic cells, members for thin-film secondary batteries, circuits for electronic components, and members for receiving sensors). Examples thereof include the members for photovoltaic cells described in paragraph of the specification of U.S. Patent Application Publication No. 2018/0178492, the members for thin-film secondary batteries described in paragraph of the specification, and the circuits for electronic components described in paragraph of the specification.

(Procedure of the Step)

Methods for producing the laminate 22 with an electronic-device member described above are not particularly limited. The electronic-device member 20 is formed on the gas barrier layer 18 on the polyimide resin layer 16 of the laminate 10 by a conventionally known method in accordance with the kinds of constituent members for the electronic-device member.

The electronic-device member 20 may not be all (hereinafter referred to as "entire member") of the member finally formed on the gas barrier layer 18 on the polyimide resin layer 16 and may be some (hereinafter referred to as "partial member") of the entire member. A substrate with a partial member which has been separated from the silicone resin layer 14 can be converted to a substrate with an entire member (the substrate with an entire member corresponds to the electronic device described later) in a later step.

Another electronic-device member may be formed on the substrate with an entire member which has been separated from the silicone resin layer 14, on the surface thereof exposed by the separation. Furthermore, use may be made of a method in which two laminates 22 with electronic-device members are laminated to each other so that the electronic-device members 20 face each other, thereby assembling a laminate with an entire member, and the two glass bases with silicone resin layers are thereafter separated from the laminate with an entire member, thereby producing an electronic device.

In the case of producing an OLED (organic light emitting diode), for example, various layers are formed and various treatments are conducted, and examples thereof include: forming a transparent electrode on the gas barrier layer 18 on the polyimide resin layer 16 of the laminate 10, on the surface 18a lying on the side opposite from the silicone resin layer 14, in order to form an organic EL structure; forming a hole injection layer, a hole transport layer, a luminescent layer, an electron transport layer, etc. by vapor deposition over the formed transparent electrode; forming a back electrode; and sealing with a sealing plate. Specific examples of the formation of these layers and treatments therefor include film deposition, vapor deposition, and bonding of sealing plates.

(Separation Step)

Figure 4:
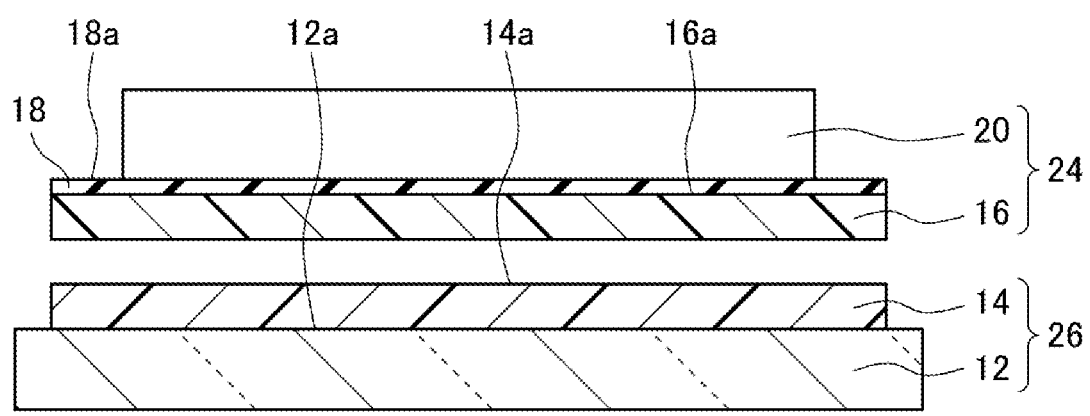
FIG. 4 is a cross-sectional view schematically illustrating a separation step.

The separation step is a step in which the laminate 22 with an electronic-device member obtained in the member formation step is separated, at the interface between the silicone resin layer 14 and the polyimide resin layer 16, into the polyimide resin layer 16 having the electronic-device member 20 superposed thereover and the glass base 26 with the silicone resin layer, as shown in FIG. 4, thereby obtaining an electronic device 24 including the electronic-device member 20, the gas barrier layer 18, and the polyimide resin layer 16.

In the case where the electronic-device member 20 on the gas barrier layer 18 on the separated polyimide resin layer 16 is some of all the necessary constituent members to be formed, the remaining constituent members can be formed after the separation on the gas barrier layer 18 on the polyimide resin layer 16.

Methods for separating the polyimide resin layer 16 from the silicone resin layer 14 are not particularly limited. For example, a sharp-edged tool or the like is inserted between the polyimide resin layer 16 and the silicone resin layer 14 to form a starting point for separation and a mixture fluid composed of water and compressed air is blown thereagainst. Thus, the polyimide resin layer 16 can be separated. Use may be made of a laser lift-off method.

A preferred method is as follows. The laminate 22 with an electronic-device member is placed on a platen so that the glass base 12 is on the upper side and the electronic-device member 20 is on the lower side, and the surface of the electronic-device member 20 is fixed to the platen by vacuum suction. While the laminate 22 is kept in this state, an edged tool or the like is first inserted between the polyimide resin layer 16 and the silicone resin layer 14. Thereafter, the surface of the glass base 12 is held with a plurality of vacuum suction pads, and the vacuum suction pads are raised in order from around the portion where the edged tool or the like has been inserted. In this manner, the glass base 26 with the silicone resin layer (see FIG. 4) can be easily separated.

In cases when the electronic-device member 20 has been formed for each of a plurality of cells, the separation between the polyimide resin layer 16 and the silicone resin layer 14 may be performed in the following manner. An electronic device 24 composed of the polyimide resin layer 16, the gas barrier layer 18, and the electronic-device member 20 is cut into the cells, and the polyimide resin layer 16 is then separated from the silicone resin layer 14 with respect to each of the cut cells. Examples of methods for cutting into cells include cutting with a laser beam and cutting with a cutting machine, e.g., a dicing saw.

In separating the electronic device 24 from the laminate 22 with an electronic-device member, debris from the silicone resin layer 14 can be more effectively inhibited from electrostatically adhering to the electronic device 24, by blowing with an ionizer or controlling the humidity.

The above-described method for producing an electronic device is suitable for producing, for example, the display device described in paragraph of the specification of U.S. Patent Application Publication No. 2018/0178492, and examples of the electronic device 24 include the ones mentioned in paragraph of the specification.

Before the separation step is conducted, portions of the laminate where the electronic-device member does not lie may be cut off.

A protective film may be applied to that surface of the electronic-device member 20 of the separated electronic device 24 which is on the side opposite from the polyimide resin layer 16.

A protective film may be applied also to that surface of the polyimide resin layer 16 of the separated electronic device 24 which is on the side opposite from the electronic-device member 20. Before the protective film is applied to the polyimide resin layer 16, a surface treatment may be given to the surface of the polyimide resin layer 16 according to need. Examples of the surface treatment include corona treatment, atmospheric-pressure plasma treatment, UV ozone treatment, and excimer UV treatment. After the surface treatment, the surface of the polyimide resin layer 16 has a contact angle with water of preferably 10 degrees or less, more preferably 5 degrees of less.

The glass base 26 with the silicone resin layer which has been separated from the laminate 22 with an electronic-device member may be recycled as a raw material for glass.

The surface of the silicone resin layer 14 of the separated glass base 26 with the silicone resin layer may be cleaned and modified, thereby making the glass base 26 reusable as a multilayer substrate for forming a polyimide resin layer thereon.

Furthermore, the silicone resin layer 14 of the separated glass base 26 with the silicone resin layer may be removed to reuse the glass as a glass base. Examples of methods for removing the silicone resin layer include a method in which the silicone resin layer is dissolved in a solvent and a method in which the silicone resin layer is mechanically ground or rubbed off.

Although the configurations described above included a gas barrier layer 18, the laminates of the invention are not limited to these and may have a configuration including no gas barrier layer 18. In the case of such configuration including no gas barrier layer 18, the electronic-device member 20 is formed or disposed on the polyimide resin layer 16.

Furthermore, as stated hereinabove, the laminate 10 may have a configuration further including a gas barrier layer (not shown) disposed between the glass base 12 and the silicone resin layer 14.

EXAMPLES

The present invention is described in detail below using Examples, etc., but the present invention is not limited by the following Examples.

In the following Examples, a glass base made of alkali-free borosilicate glass (coefficient of linear expansion, $39 \times 10^{-7}/°$ C.; trade name "AN Wizus", manufactured by AGC Inc.) was used as a supporting base.

Examples 1 to 7 are Examples according to the present invention, and Examples 8 and 9 are Comparative Examples.

(Production of Curable Silicone 1)

Into a 1-L flask were introduced triethoxymethylsilane (179 g), toluene (300 g), and acetic acid (5 g). The mixture was stirred at 25° C. for 20 minutes and was thereafter heated to 60° C. and reacted for 12 hours. The obtained liquid reaction mixture was cooled to 25° C. and then washed three times with water (300 g). Chlorotrimethylsilane (70 g) was added to the washed liquid reaction mixture, and the resultant mixture was stirred at 25° C. for 20 minutes and was then heated to 50° C. and reacted for 12 hours. The obtained liquid reaction mixture was cooled to 25° C. and then washed three times with water (300 g). The toluene was removed by distillation from the washed liquid reaction mixture to obtain a slurry-state residue, which was dried overnight with a vacuum dryer, thereby obtaining curable silicone 1 as a white organopolysiloxane compound. In curable silicone 1, [number of T units]:[number of M units]=87:13 (molar ratio). In curable silicone 1, the molar ratio of M units to T units was 13:87, all the organic groups were methyl, and the average number of OX groups was 0.02. The average number OX groups is a value indicating how many OX groups (X is a hydrogen atom or a hydrocarbon group) have been bonded to one Si atom on average.

(Production of Curable Composition 1)

The curable silicone (20 g) was mixed with a zirconium octylate compound ("ORGATIX ZC-200", manufactured by Matsumoto Fine Chemical Co., Ltd.) (0.16 g) and cerium (III) 2-ethylhexanoate (manufactured by Alfa Aesar; metal content, 12%) (0.17 g) as metal compounds and with Isoper G (manufactured by Tonen General Sekiyu K.K.) (19.7 g) as a solvent. The obtained liquid mixture was filtered with a filter having a pore diameter of 0.45 μm, thereby obtaining curable composition 1.

Example 1

(Production of Multilayer Substrate Composed of Glass Base and Silicone Resin Layer)

A PET film (COSMOSHINE A4160, manufactured by Toyobo Co., Ltd.; thickness, 50 μm) was prepared as a release film, Curable composition 1 produced above was applied to a surface of the film, and the coated film was heated at 140° C. for 10 minutes with a hot plate, thereby forming a silicone resin layer.

Subsequently, glass base "AN Wizus" (supporting base) having a size of 100×100 mm and a thickness of 0.5 mm which had been cleaned with a water-based glass detergent ("PK-LCG213", manufactured by PARKER CORPORATION) and then rinsed with pure water was laminated to the PET film (size: 80×80 mm) having the silicone resin layer formed thereon. Thus, a laminate composed of the glass base, silicone resin layer, and PET film disposed in this order was produced.

Next, the obtained laminate was disposed in an autoclave and heated for 30 minutes under the conditions of 60° C. and 1 MPa. Thereafter, the PET film was peeled off, and the multilayer substrate composed of the glass base and the silicone resin layer was introduced into an oven preheated to 300° C., in which the multilayer substrate was annealed for 30 minutes. The thickness of the silicone resin layer after the annealing was measured with a film thickness measuring system ("F20", manufactured by Filmetrics Japan, Inc.).

(Production of Laminate Composed of Glass Base, Silicone Resin Layer, and Polyimide Resin Layer (Colorless Polyimide Film))

A corona treatment was given to the silicone resin layer of the multilayer substrate obtained above. Thereafter, a colorless polyimide varnish ("Neopulim H230", manufactured by Mitsubishi Gas Chemical Co., Ltd.) for forming polyimide containing fluorine atoms was applied thereto with a spin coater, and the coated substrate was heated at 80° C. for 20 minutes with a hot plate. Subsequently, using an inert-gas oven, the coated substrate was heated at a temperature of 400° C. for 30 minutes in a nitrogen atmosphere, thereby obtaining a laminate including the glass base, the silicone resin layer, and a polyimide resin layer (colorless polyimide film) in this order. The polyimide resin layer included a polyimide containing fluorine atoms.

(Production of Laminate Composed of Glass Base and Colorless Polyimide Film)

Glass base "AN Wizus" (supporting base) having a size of 100×100 mm and a thickness of 0.5 mm which had been cleaned with a water-based glass detergent ("PK-LCG213, manufactured by PARKER CORPORATION) and then rinsed with pure water was prepared. The colorless polyimide varnish ("Neopulim H230", manufactured by Mitsubishi Gas Chemical Co., Ltd.) for forming polyimide containing fluorine atoms was applied to the glass base with a spin coater, and the coated glass base was heated at 80° C. for 20 minutes with a hot plate. Subsequently, using an inert-gas oven, the coated glass base was heated at a temperature of 400° C. for 30 minutes in a nitrogen atmosphere, thereby obtaining a laminate including the glass base and a colorless polyimide film in this order.

(Analysis of Polyimide Resin Layer (Colorless Polyimide Film) by Transmission Infrared Spectroscopy)

The polyimide resin layer was peeled from the laminate including a glass base, a silicone resin layer, and a polyimide resin layer in this order and was allowed to stand still overnight in an environment having a room temperature of 23° C. and a relative humidity of 45%. Thereafter, a small portion of the polyimide resin layer was cut out with a knife and the cut colorless polyimide film was put into a diamond cell and examined in this state to acquire an infrared transmission spectrum. The devices used were Nicolet 6700 FT-IR and Nicolet Continuum, manufactured by Thermo Fisher Scientific. The examination was conducted under the following conditions: detector, MCT/A; number of integrations, 64; wavenumber resolution, 4.0 cm$^{-1}$; examination range, 650-4,000 cm$^{-1}$. In order to determine the ratio between the area of the peak appearing at 1,650-1,750 cm$^{-1}$ derived from imide groups and the area of the peak appearing at 3,150-3,750 cm$^{-1}$ derived from hydroxyl groups, the spectrum was analyzed using analysis software OMNIC Ver. 8.2 (manufactured by Thermo Fisher Scientific) in the following manner.

First, a base line was drawn on the infrared transmission spectrum of the colorless polyimide film to correct the spectrum. The imide-group-derived peak was subjected to the base-line correction in which 1,550 cm$^{-1}$ and 1,850 cm$^{-1}$ were used as reference wavenumbers, and the hydroxyl-group-derived peak was subjected to the base-line correction in which 3,150 cm$^{-1}$ and 3,750 cm$^{-1}$ were used as reference wavenumbers. Subsequently, using "Peak Area Tool" of the analysis software, the area of each peak was determined. With respect to the imide-derived peak, the area of the portion ranging from 1,650 cm$^{-1}$ to 1,750 cm$^{-1}$ was determined. With respect to the hydroxyl-group-derived peak, the area of the portion ranging from 3,150 cm$^{-1}$ to 3,750 cm$^{-1}$ was determined. Finally, the ratio (IR peak area ratio) was calculated by dividing the area of the peak derived from hydroxyl groups by the area of the peak derived from imide groups. In Example 1, in which Neopulim H$_{230}$ had been used, the IR peak area ratio was 0.50.

(Formation of Gas Barrier Film and Heat Resistance Test)

Using a plasma-assisted CVD device, a silicon nitride film (SiN film) having a thickness of 50 nm was formed on the surface of the polyimide resin layer (colorless polyimide film) of the laminate. That is, the laminate was made to have a configuration including a gas barrier layer. Using an inert-gas oven, a heat resistance test was conducted in which the laminate was heated at a temperature of 430° C. for 1 hour in a nitrogen atmosphere.

(Peeling of the Polyimide Resin Layer)

An end portion of the polyimide resin layer of the laminate which had undergone the heat resistance test was pinched with fingers and pulled up vertically. Thus, the polyimide resin layer having the SiN film formed on the surface thereof was peeled from the laminate.

(Examination of the Polyimide Resin Layer for Yellowness Index (YI))

The polyimide resin layer peeled from the laminate after the heat resistance test was examined for transmittance with spectrophotometer for ultraviolet and visible regions "V-560" (manufactured by JASCO Corp.), and the yellowness index (YI) was determined in accordance with JIS K 7373. Auxiliary illuminant C was used, and the YI was determined from the following formula 2 using the XYZ color system.

$$YI=100(1.2769X-1.0592Z)/Y \qquad \text{(Formula 2)}$$

YI: yellowness index

X, Y, Z: tristimulus values of the test specimen or test piece in the XYZ color system in the case of using auxiliary illuminant C The polyimide resin layer peeled from the laminate had the SiN film formed on the surface thereof.

In Example 1, the polyimide resin layer peeled from the laminate which had undergone the heat resistance test had a YI (first yellowness index) of 14. A reference laminate composed of a glass base and a polyimide resin layer directly formed thereon was prepared and heated at a temperature of 430° C. for 1 hour in a nitrogen atmosphere, and the polyimide resin layer peeled from the reference laminate thereafter (after the heat resistance test) had a YI (second yellowness index) of 35. The second yellowness index is a measured value for the polyimide resin layer alone without the glass base.

(Examination of the Polyimide Resin Layer for Refractive Index)

Using a refractometer (prism coupler "2010/M", manufactured by Metricon Corp.), the polyimide resin layer peeled from the laminate which had undergone the heat resistance test was examined for refractive index for light with a wavelength of 658 nm. Thus, a first refractive index was obtained.

A reference laminate composed of a glass base and a polyimide resin layer directly formed thereon was prepared and heated at a temperature of 430° C. for 1 hour in a nitrogen atmosphere, and the polyimide resin layer peeled from the reference laminate thereafter (after the heat resistance test) was examined for refractive index for light with a wavelength of 658 nm using the refractometer (prism coupler "2010/M", manufactured by Metricon Corp.). Thus, a second refractive index was obtained. The second refractive index is a measured value for the polyimide resin layer alone without the glass base. The first refractive index was subtracted from the second refractive index to determine a refractive-index difference.

(Evaluation of Yellowing-Inhibitive Effect)

A value (YI difference) obtained by subtracting the YI (first yellowness index) of the polyimide resin layer formed on a silicone resin layer from the YI (second yellowness index) of the polyimide resin layer on a glass base was used as an index to yellowing-inhibitive effect to evaluate the effect in accordance with the following evaluation criteria.

A: YI difference of 20 or larger
B: YI difference of 10 or larger but less than 20
C: YI difference less than 10

Example 2 to Example 9

Evaluation samples were produced and evaluated for yellowing-inhibitive effect in the same manners as in Example 1, except that the fluorine-atom-containing colorless polyimide varnishes ("Neopulim H230", "Neopulim H310", and "Neopulim H410", all manufactured by Mitsubishi Gas Chemical Co., Ltd.) were used and the thicknesses of the colorless polyimide film and silicone resin layer were changed, as shown in Table 1.

The evaluation results are shown in Table 1. A comparison among Examples 1 to 9 revealed that in cases when the IR peak area ratio was 0.9 or less, the yellowing of the polyimide resin layer was able to be inhibited by disposing a silicone resin layer between the glass base and the polyimide resin layer.

In cases when the IR peak area ratio was 0.6 or less, the yellowing of the polyimide resin layer was able to be further inhibited.

In addition, in cases when the IR peak area ratio is 0.9 or less, preferably 0.6 or less, a larger difference in refractive index results. The increased difference in refractive index was effective in inhibiting the yellowing of the polyimide resin layer.

While the present invention has been described in detail and with reference to specific embodiments thereof, it will be apparent to one skilled in the art that various changes and modifications can be made therein without departing from the spirit and scope thereof.

REFERENCE SINGS LIST

10 Laminate
12 Glass base
12a Surface
14 Silicone resin layer
14a Surface
16 Polyimide resin layer
16a Surface
18 Gas barrier layer
18a Surface
20 Electronic-device member
22 Laminate with electronic-device member
24 Electronic device
26 Glass base with silicone resin layer
$H_1$, $H_2$ Film thickness

The invention claimed is:

1. A laminate comprising a glass base, a silicone resin layer, and a polyimide resin layer,
   wherein the polyimide resin layer comprises a fluorine-atom-containing polyimide and,
   when examined by infrared absorption, the polyimide resin layer gives a spectrum in which a ratio of an area of a peak appearing at 3,150 $cm^{-1}$ to 3,750 $cm^{-1}$ to an area of a peak appearing at 1,650 $cm^{-1}$ to 1,750 $cm^{-1}$ is 0.9 or less.

2. The laminate according to claim 1, wherein the ratio of the peak area is 0.6 or less.

TABLE 1

| | Polyimide resin layer | | Thickness | Examination Results | | | | |
|---|---|---|---|---|---|---|---|---|
| | | IR | | of silicone | YI of | YI of | Evaluation results | | |
| | Product No. | peak area ratio | Thickness (μm) | resin layer (μm) | polyimide resin layer on silicone resin layer | polyimide resin layer on glass base | YI difference | Yellowing inhibition | Refractive-index difference |
| Example 1 | Neopulim H230 | 0.50 | 5.0 | 1.0 | 14 | 35 | 21 | A | 0.009 |
| Example 2 | Neopulim H230 | 0.50 | 5.0 | 7.0 | 8 | 35 | 27 | A | 0.010 |
| Example 3 | Neopulim H230 | 0.50 | 5.0 | 10.0 | 7 | 35 | 28 | A | 0.010 |
| Example 4 | Neopulim H230 | 0.50 | 5.0 | 25.0 | 7 | 35 | 28 | A | 0.010 |
| Example 5 | Neopulim H230 | 0.50 | 10.0 | 7.0 | 15 | 45 | 30 | A | 0.011 |
| Example 6 | Neopulim H310 | 0.64 | 5.0 | 1.0 | 18 | 32 | 14 | B | 0.005 |
| Example 7 | Neopulim H310 | 0.64 | 5.0 | 7.0 | 13 | 32 | 19 | B | 0.007 |
| Example 8 | Neopulim H410 | 0.91 | 5.0 | 1.0 | 35 | 38 | 3 | C | 0.001 |
| Example 9 | Neopulim H410 | 0.91 | 5.0 | 7.0 | 29 | 38 | 9 | C | 0.003 |

3. The laminate according to claim 1, wherein a ratio represented by [average film thickness of the polyimide resin layer]/[average film thickness of the silicone resin layer] is from 0.02 to 20.

4. A laminate with an electronic-device member, comprising the laminate according to claim 1 and an electronic-device member disposed on the polyimide resin layer of the laminate.

5. A method for producing an electronic device comprising:
   forming an electronic-device member on the polyimide resin layer of the laminate according to claim 1 to obtain a laminate with the electronic-device member; and
   separating an electronic device comprising the polyimide resin layer and the electronic-device member from the laminate with the electronic-device member to obtain the electronic device.

\* \* \* \* \*